(12) United States Patent
Antrobus (10) Patent No.: US 8,701,804 B1
(45) Date of Patent: Apr. 22, 2014

(54) CONSTANT RECHARGING AIR AND ELECTRIC ALTERNATING VEHICLE POWER SYSTEM

(71) Applicant: Craig L. Antrobus, Summerland (CA)

(72) Inventor: Craig L. Antrobus, Summerland (CA)

( * ) Notice: Subject to any disclaimer, the term of this patent is extended or adjusted under 35 U.S.C. 154(b) by 0 days.

(21) Appl. No.: 13/621,326

(22) Filed: Sep. 17, 2012

(51) Int. Cl.
*B60K 1/02* (2006.01)
*B60K 3/00* (2006.01)
*B60K 6/00* (2007.10)

(52) U.S. Cl.
USPC .................. 180/65.31; 180/65.285; 180/302; 903/906

(58) Field of Classification Search
USPC ........... 180/165, 2.1, 2.2, 65.21, 65.6, 65.31, 180/302, 65.285, 65.265; 903/906, 907
See application file for complete search history.

(56) References Cited

U.S. PATENT DOCUMENTS

| | | | |
|---|---|---|---|
| 769,565 A | 9/1904 | Owen et al. | |
| 4,413,698 A * | 11/1983 | Conrad et al. | 180/305 |
| 4,763,751 A * | 8/1988 | Gardner, Jr. | 180/305 |
| 6,213,234 B1 | 4/2001 | Rosen et al. | |
| 7,464,675 B1 | 12/2008 | Schechter | |
| 7,828,091 B2 | 11/2010 | Wedderburn, Jr. et al. | |
| 7,926,610 B2 * | 4/2011 | Adli | 180/302 |
| 8,607,907 B2 * | 12/2013 | Sadrmajles et al. | 180/65.51 |
| 2005/0211480 A1 | 9/2005 | Kejha | |
| 2006/0225941 A1 | 10/2006 | Cole | |
| 2007/0258834 A1 | 11/2007 | Froloff et al. | |
| 2010/0314186 A1 | 12/2010 | Ma | |
| 2010/0326749 A1 | 12/2010 | Mensah | |

* cited by examiner

*Primary Examiner* — John Walters
(74) *Attorney, Agent, or Firm* — Richard L. Miller (57) ABSTRACT

A system for a vehicle. The system includes electric and compressed gas modes, a plurality of electric motors/generators and compressed gas motors, battery arrays, and transfer switches. The plurality of electric motors/generators and compressed gas motors are operatively connected to the wheels of the vehicle. When the system is in the electric mode, a portion of the plurality of electric motors/generators operate as motors and propel the vehicle, while a remaining portion of the plurality of electric motors/generators operate as generators and charge the battery arrays. When the system is in the gas mode, a portion of the plurality of compressed gas motors operate as motors and propel the vehicle. The transfer switches determine automatically—based upon predetermined—when the system should operate in the electric or the compressed gas mode.

31 Claims, 9 Drawing Sheets

CONSTANT RECHARGING AIR AND ELECTRIC ALTERNATING VEHICLE POWER SYSTEM

1. BACKGROUND OF THE INVENTION

A. Field of the Invention

The embodiments of the present invention relate to a power system for a vehicle, and more particularly, the embodiments of the present invention relate to a constant recharging air and electric alternating power system for a vehicle.

B. Description of the Prior Art

13 Numerous innovations for hybrid vehicles and related systems have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a constant recharging air and electric alternating power system for a vehicle.

(1) U.S. Pat. No. 769,565 to Owen et al.

U.S. Pat. No. 769,565—issued to Owen et al. on Sep. 6, 1904 in U.S. class 303 and subclass 11 teaches a compressed-air supply for electric cars, which has a compressed-air lank, an air-pump, a gearing for actuating the air-pump from a movable part of the car, and a fluid-controlled mechanism controlled by the operating-lever of the electric car and connected with the gearing ti throw the latter in or out of gear by fluid-pressure from the compressed-air tank.

(2) U.S. Pat. No. 6,213,234 to Rosen et al.

U.S. Pat. No. 6,213,234—issued to Rosen et at on Apr. 10, 2001 in U.S. class 180 and subclass 65.245—teaches a hybrid electric vehicle powered by a combination fuel cell and a gas turbine driven generator. The fuel cell is sized relative to the gas turbine and the vehicle so that up to about 50% of the vehicle's maximum sustainable power is supplied by the fuel cell electrical power output. This relative power source size achieves improved fuel consumption compared to vehicles powered by combustion engines without the cost penalty associated with a fuel cell large enough to power the vehicle. At low power requirements, the fuel cell efficiently provides all or most of the vehicle's power requirements. As the power requirements increase, additional fuel is burned in the gas turbine.

(3) United States Patent Application Publication Number 2005/0211480 to Kejha.

United States Patent Application Publication Number 2005/0211480—published to Kejha on Sep. 29, 2005 in U.S. class 180 and subclass 65.245—teaches a long range hydrogen fueled vehicle that carries at least two passengers, and which has at least three wheels. The passengers sit in tandem, and most of the batteries or fuel cell systems are located on the sides of the passengers. The vehicle has an aerodynamically shaped body, with substantially reduced frontal area and drag. The body is lightweight, made from shock absorbing materials and structures, and has pressure-airless tires that enhances the safety of the passengers. The vehicle also includes a hydrogen-electric or hydrogen-pneumatic hybrid propulsion system with quick refueling from existing infrastructure.

(4) United States Patent Application Publication Number 2006/0225941 to Cole.

United States Patent Application Publication Number 2006/0225941—published to Cole on Oct. 12, 2006 in U.S. class 180 and subclass 302—teaches a compressed air powered vehicle that includes a vehicle chassis having wheels. An electric drive motor drivingly engages at least one of the wheels. An electric generator is electrically connected to the electric drive motor, and an air motor drivingly engaging the electric generator. A compressed air source is pneumatically connected to the air motor, and an air compressor is provided on the chassis and pneumatically connected to the compressed air source to replenish compressed air in the compressed air tanks as needed.

(5) United States Patent Application Publication Number 2007/0258834 to Froloff et al.

United States Patent Application Publication Number 2007/0258834—published to Froloff el al. on Nov. 8, 2007 in U.S. class 417 and subclass 364—teaches a system and method for managing compressed gas as an energy storage medium for providing power to vehicle uses. Compressed air has many pneumatic uses both inside and outside of vehicles, and an Air Hybrid engine is a source of compressed air energy for storage. This source of compressed air energy is stored, managed, and used in many methods and devices. The gas storage system presented is distributed over multiple storage units coupled to a gas flow network for control storage and use of the compressed gas.

(6) U.S. Pat. No. 7,464,675 to Schechter.

U.S. Pat. No. 7,464,675—issued to Schechter on Dec. 16, 2008 in U.S. class 123 and subclass 90.15—teaches an air-hybrid engine operates in two operational modes. It employs camshafts with cam lobe activators, and camshaft phase shifters to operate and control the engine valves. It uses a different cam lobe for operating an engine valve during each of the two operational modes, and it uses camshaft phase shifters to vary the valve event timing and duration. The system exploits non-linearity that exists in relationship between the piston motion and the camshaft rotation. Varying the phase relationship between the camshaft and the engine crankshaft in a pre-determined specific way varies the duration of the engine valve opening in the required way, thus varying the volumes of air received into and discharged from the engine.

(7) U.S. Pat. No. 7,828,091 to Wedderburn, Jr. et al.

U.S. Pat. No. 7,828,091—issued to Wedderburn, Jr. et al. on Nov. 9, 2010 in U.S. class 180 subclass 2.2—teaches an all electric vehicle that produces zero $CO_2$ emissions. This vehicle is considered air and electric because it uses a wind turbine generator, compressed air, and a high voltage battery to generate electricity to power the DC motors that drive this vehicle. Therefore, this vehicle is called the Wind Turbine Generator Air Electric Vehicle (WTGAEV). There exists an integrated system that enables this vehicle to maintain a consistent energy supply to automatically recharge the high voltage battery. This integrated system consists of a wind turbine generator (WTG), an air motor, an air compressor, an air tank, and a battery. The power train receives its energy from the motion of the vehicle. When the vehicle is in forward motion, the air flow from the nose of the vehicle is collected and directed toward the blades of the WTG that generates electric.

(8) United States Patent Application Publication Number 2010/0314186 to Ma.

United States Patent Application Publication Number 2010/0314186—published to Ma on Dec. 16, 2010 in U.S. class 180 and subclass 165—teaches an air hybrid vehicle powered by an internal combustion engine that may or may not be equipped with a supercharger or turbocharger for boosting the engine. Power is taken from the vehicle to drive the engine during deceleration or coasting of the vehicle. The engine absorbs kinetic energy from the vehicle and uses that energy to produce boost air that is transferred and stored in a boost air storage tank on board the vehicle at a storage pressure not exceeding 3 bar absolute pressure. The vehicle achieves fuel saving and high performance by boost substitution when this boost air is used to supply the engine for short periods during acceleration or cruising of the vehicle without relying on any air charger, temporarily fulfilling the role of an air charger without actually driving an air charger by substituting the boost normally supplied by an air charger with an equivalent boost produced and stored during regenerative braking. To accommodate a large boost air storage tank, the body of the vehicle is adapted with air-tight volumes linked together to form one large storage volume.

(9) United States Patent Application Publication Number 2010/0326749 to Mensah.

United States Patent Application Publication Number 2010/0326749—published to Mensah on Dec. 30, 2010 in U.S. class 180 and subclass 65.31—teaches a pressurized air system that includes a compressed air tank, a turbine coupled to, and in fluid communication with, the compressed air tank and structured to convert mechanical energy, and an electric motor. The electric motor is coupled to, and in electrical communication with, the turbine, and having an output shaft. An electrical compressor is structured to compress air. The electrical compressor is coupled to, and in electrical communication with, the turbine. The electrical compressor is also coupled to, and in fluid communication with, the compressed air tank. The turbine receives compressed air from the tank, and the turbine generates electricity. Further, a portion of the electricity is directed to the motor, and the remaining electricity is directed to the electrical compressor, whereby the electrical compressor provides compressed air to the compressed air tank.

It is apparent that numerous innovations for hybrid vehicles and related systems have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a constant recharging air and electric alternating power system for a vehicle.

2. SUMMARY OF THE INVENTION

Thus, an object of the embodiments of the present invention is to provide a constant recharging air and electric alternating power system for a vehicle, which avoids the disadvantages of the prior art.

Briefly stated, another object of the embodiments of the present invention is to provide a constant recharging air and electric alternating power system for a vehicle having wheels. The constant recharging air and electric alternating power system includes an electric mode, a compressed gas mode, a plurality of electric motors/generators, a plurality of compressed gas motors, battery arrays, and transfer switches. The plurality of electric motors/generators and the plurality of compressed gas motors are for operatively connecting to the wheels of the vehicle. When the constant recharging air and electric alternating power system is in the electric mode thereof, a portion of the plurality of electric motors/generators operate as motors powered by the battery arrays aril propel the vehicle, while a remaining portion of the plurality of electric motors/generators operate as generators and constantly charge the battery arrays. When the constant recharging air and electric alternating power system is in the gas mode thereof, a portion of the plurality of compressed gas motors operate as motors and propel the vehicle, while a portion of the plurality of electric motors/generators operate as generators and constantly charge said battery arrays. The transfer switches determine automatically—based upon predetermined values—when the constant recharging air and electric alternating power system should operate in the electric mode or in the compressed gas mode.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

A. Introductory.

10 constant recharging air and electric alternating power system of embodiments of present invention for vehicle 12

12 vehicle

14 wheels of vehicle 12

14*a* independently suspended front wheels of wheels 14 of vehicle 12

14b independently suspended rear wheels of wheels 14 of vehicle 12

B. Configuration of Constant Recharging Air and Electric Alternating Power System 10.

16 plurality of electric motors/generators for operatively connecting to wheels 14 of vehicle 12

18 plurality of compressed gas motors for of operatively connecting to wheels 14 of vehicle 12

20 battery arrays 22 transfer switches 24 forwarded operating electric motor/generator of each pair of electric motors/generators of plurality of electric motors/generators 16

26 rearward operating electric motor/generator of each pair of electric motors/generators of plurality of electric motors/generators 16

28 forward operating compressed gas motor of each pair of compressed gas motors of plurality of compressed gas motors 18

30 rearward operating compressed gas motor of each pair of compressed gas motors of plurality of compressed gas motors 18

32 at least one bi-directional rotary compressor for operatively connecting to, so as to be powered by, wheels 14 of vehicle 12

34 compressed gas storage tank 36 external electrical power source 38 external compressed gas fill source 40 front battery array of battery arrays 20

42 rear battery array of battery arrays 20

44 first check valve 46 second check valve 48 third check valve 50 fourth check valve 52 first open/closed valve 54 second open/closed valve 56 front emergency clutch for connecting independently suspended front wheels 14a of wheels 14 of vehicle 12 together so as to go from a live axle to a dead axle 58 rear emergency clutch for connecting independently suspended rear wheels 14b of wheels 14 of vehicle 12 together so as to go from a live axle to a dead axle

5. DETAILED DESCRIPTION OF THE PREFERRED EMBODIMENTS

A. Introductory.

Figure 1:
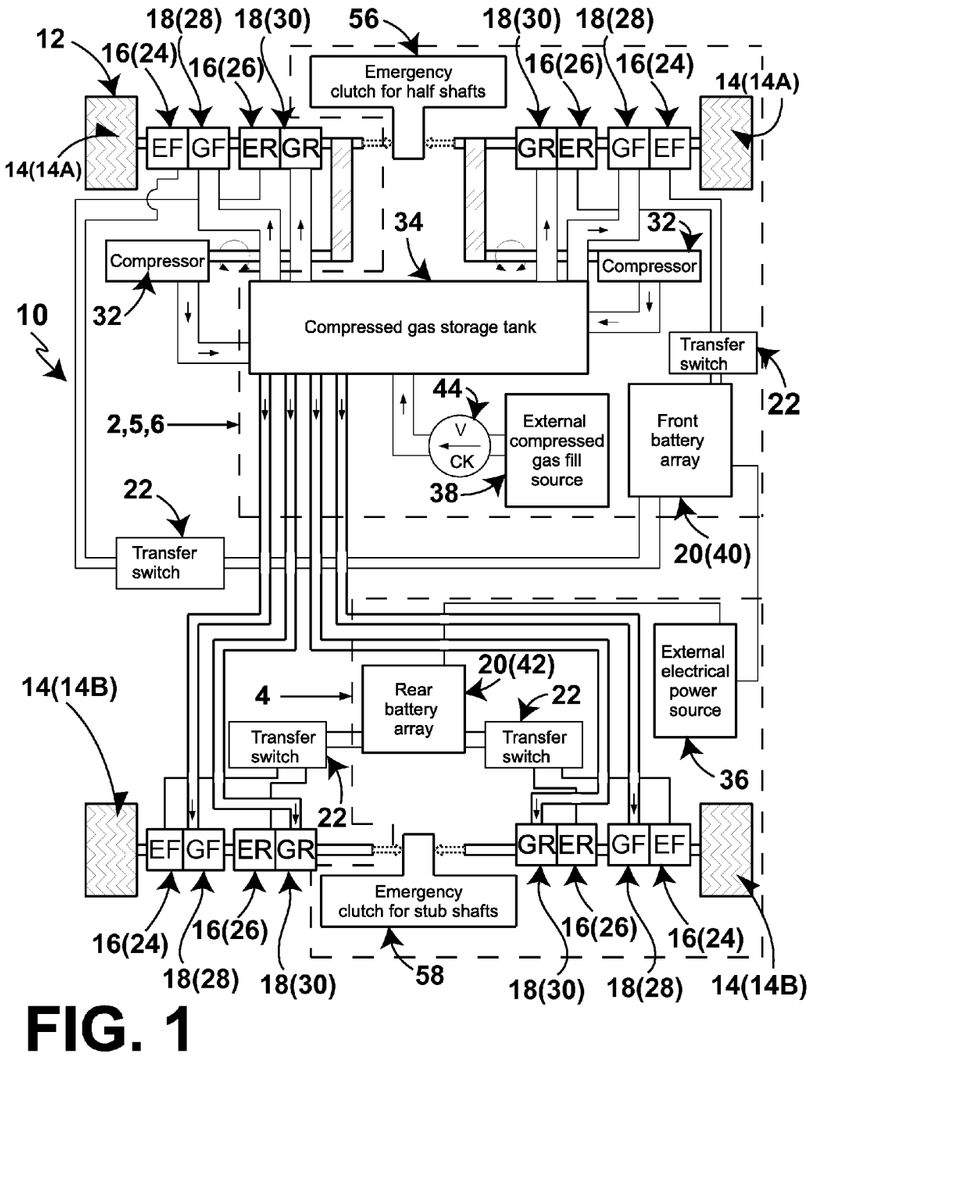
FIG. 1 is a diagrammatic block diagram of the constant recharging air and electric alternating power system of the embodiments of the present invention for a vehicle.
Figure 2:
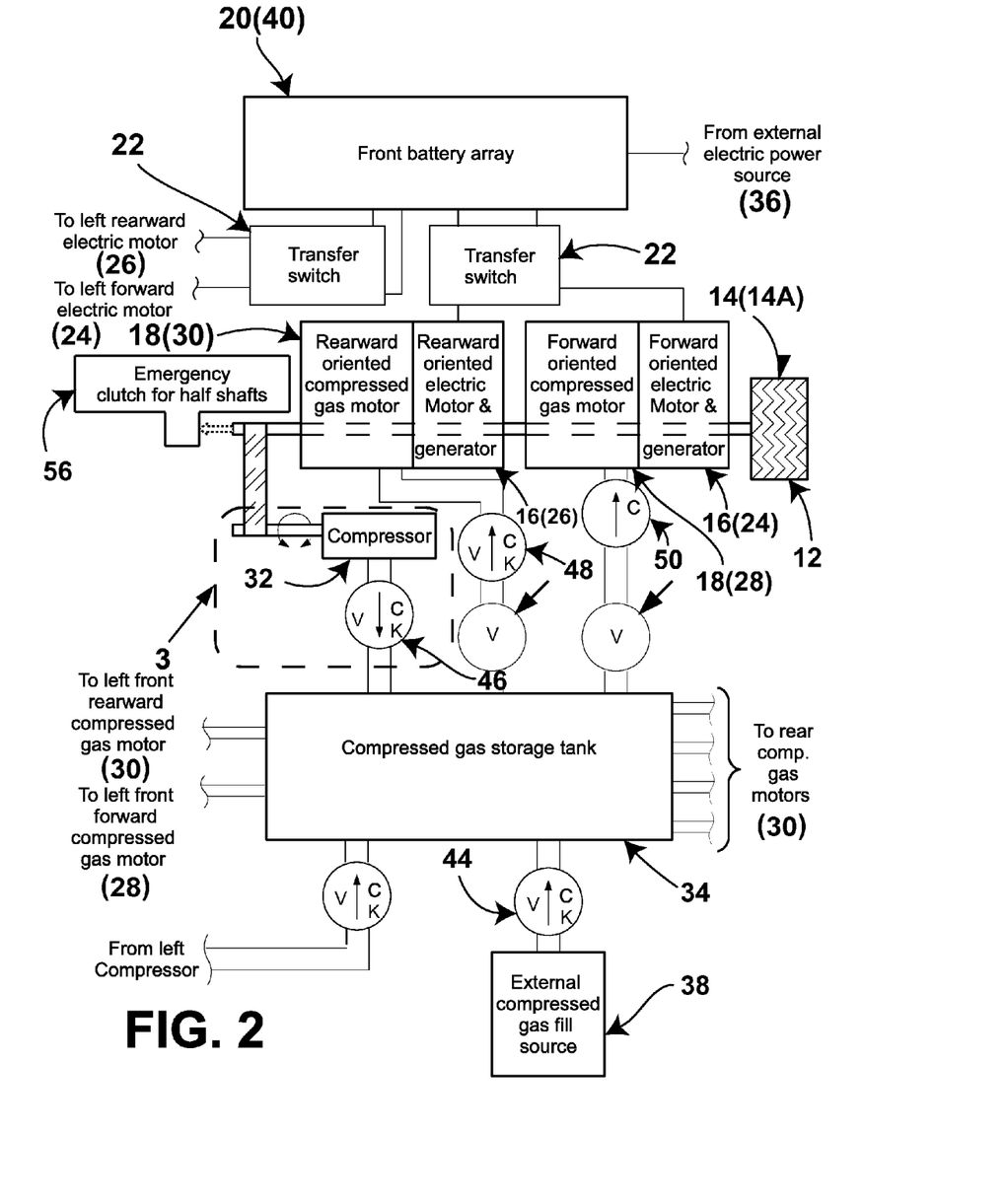
FIG. 2 is an enlarged diagrammatic block diagram of the area generally enclosed by the dotted shape identified by ARROW 2 in FIG. 1.
Figure 3:
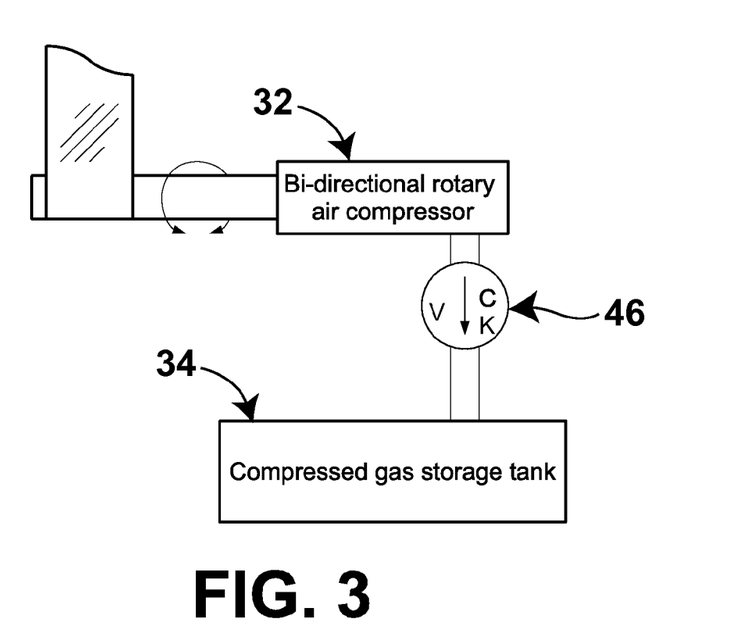
FIG. 3 is an enlarged diagrammatic block diagram of the area generally enclosed by the clotted shape identified by ARROW 3 in FIG. 2.
Figure 4:
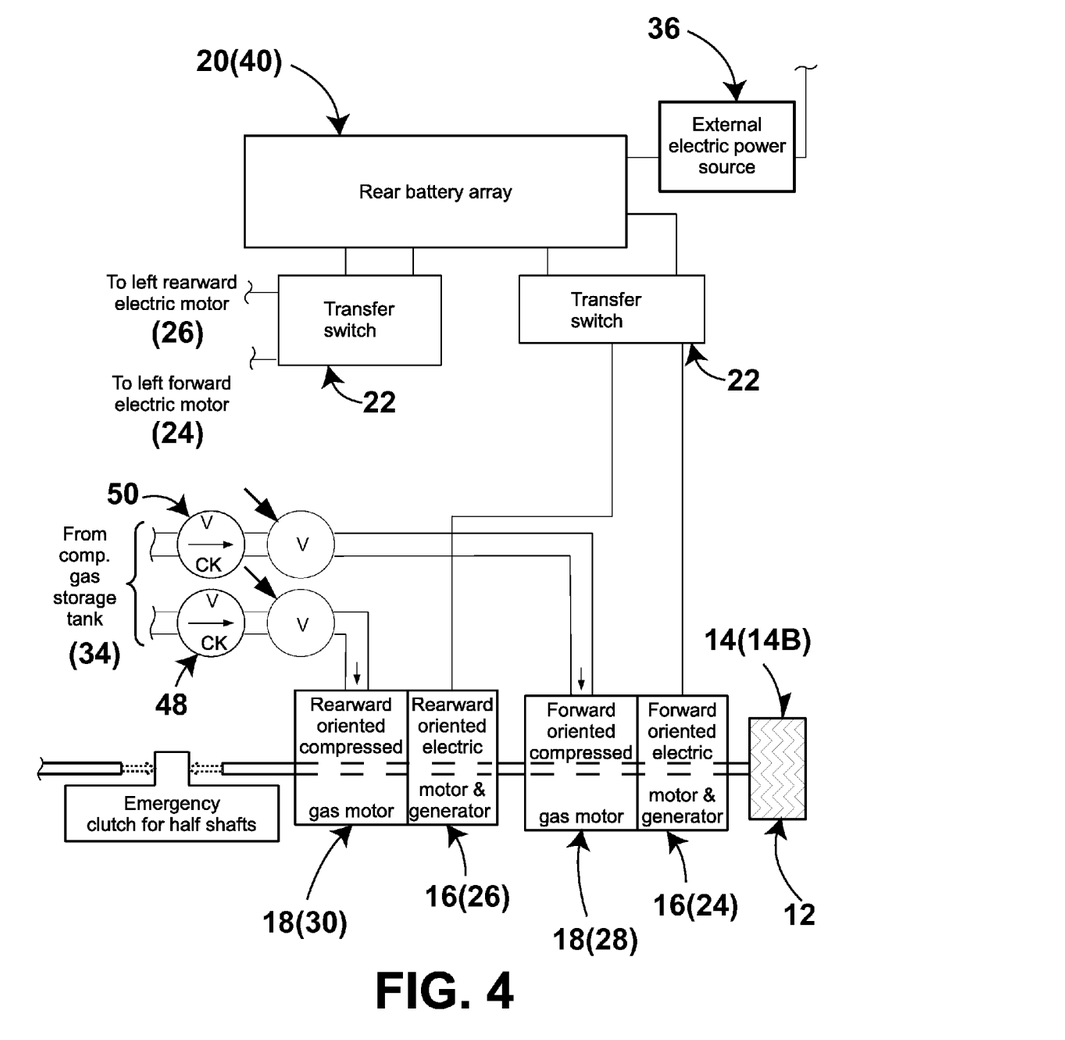
FIG. 4 is an enlarged diagrammatic block diagram of the area generally enclosed by the dotted shape identified by ARROW 4 in FIG. 1.
Figure 5:
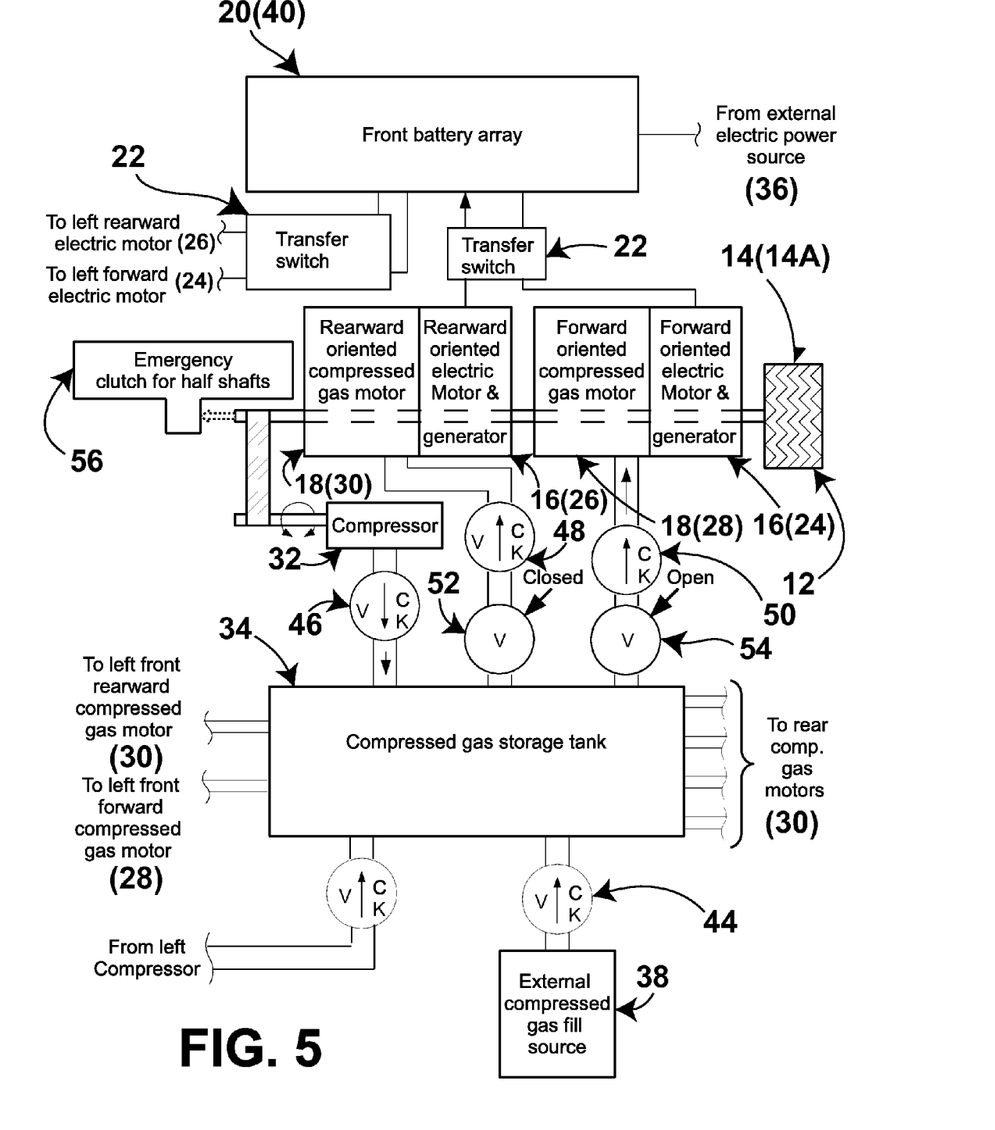
FIG. 5 is a diagrammatic block diagram illustrating the flow of energy, when using compressed gas to propel the vehicle forward, among the components contained inside the dotted shape identified by ARROW 5 in FIG. 1.
Figure 6:
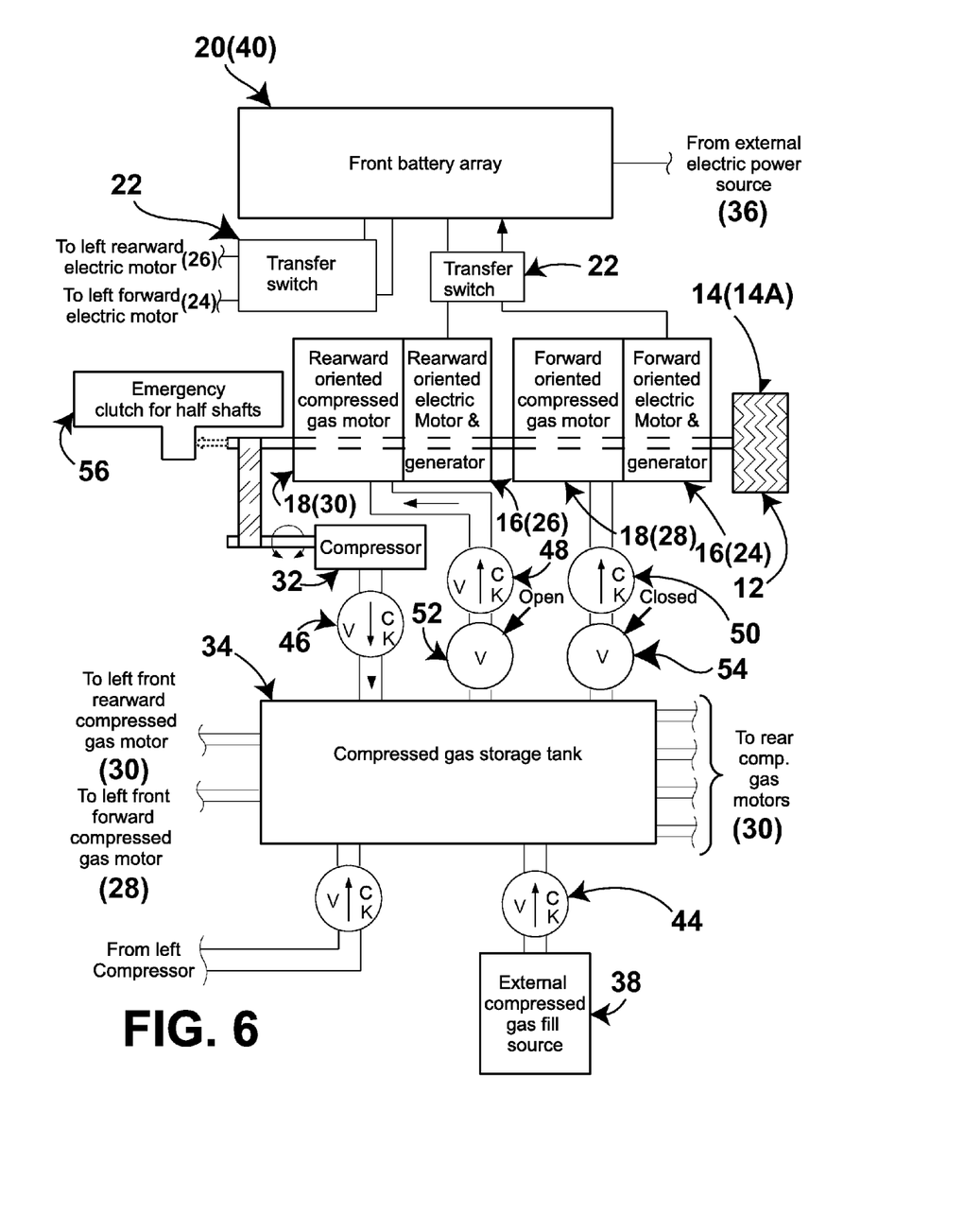
FIG. 6 is a diagrammatic block diagram similar to FIG. 5, except illustrating the constant recharging air and electric alternating power system of the embodiments of the present invention using compressed gas power to propel the vehicle in reverse.
Figure 7:
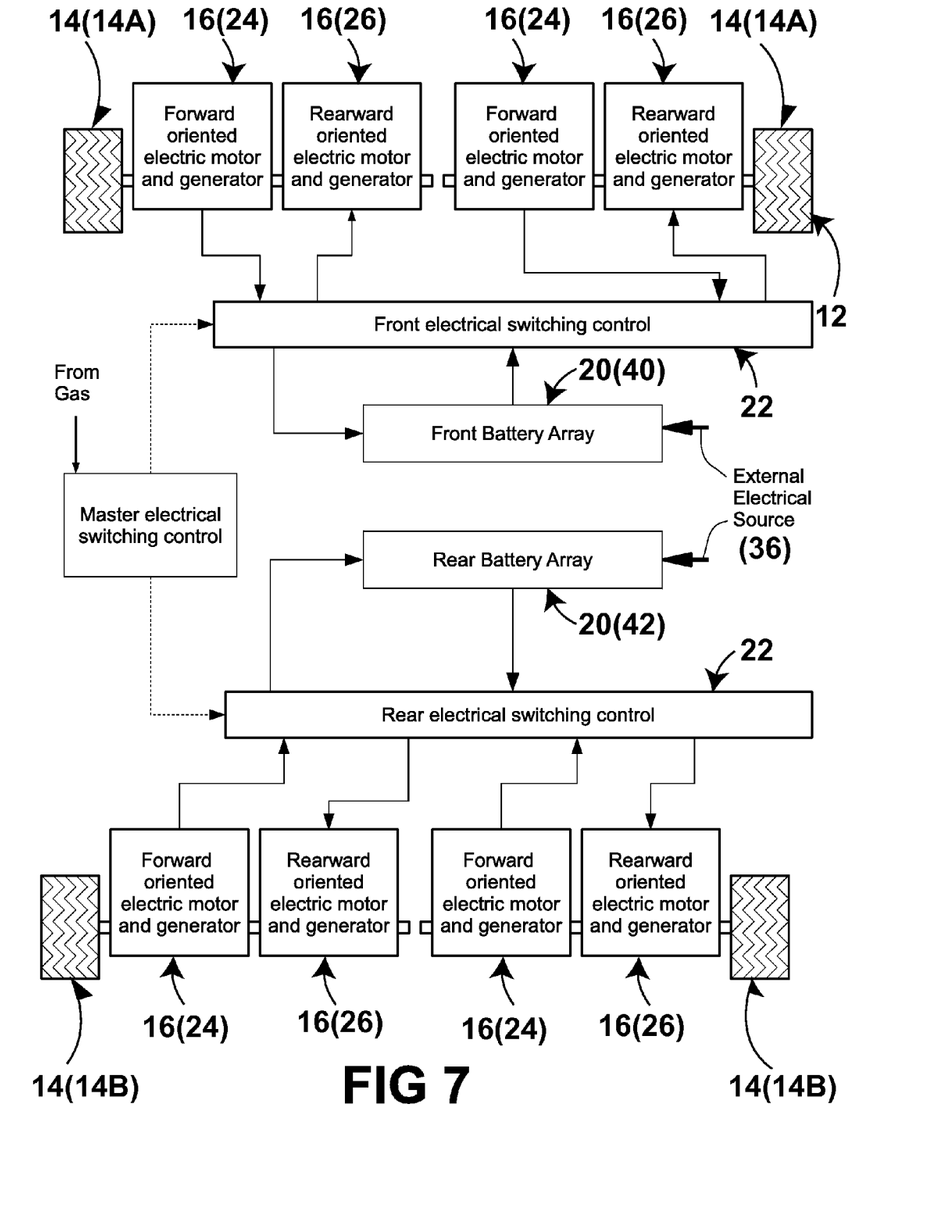
FIG. 7 is a diagrammatic block diagram illustrating the flow of electrical energy among selected components of the constant recharging air and electric alternating power system of the embodiments of the present invention when using electrical energy to propel the vehicle rearward, with the flow being coordinated by a switching control system.
Figure 8:
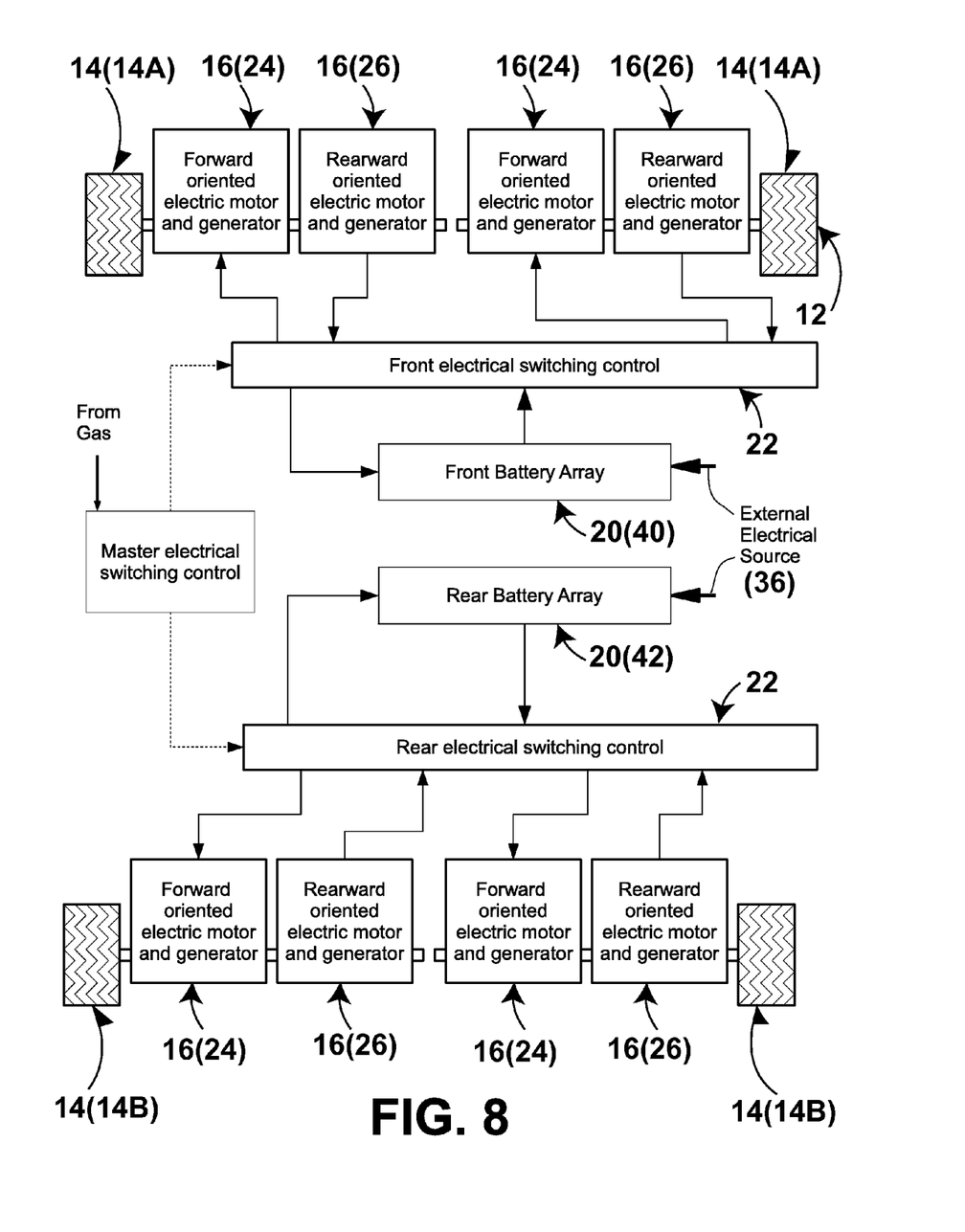
FIG. 8 is a diagrammatic block diagram similar the FIG. 7, except illustrating the constant recharging air and electric alternating power system of the embodiments of the present invention using electrical energy to propel the vehicle forward.
Figure 9:
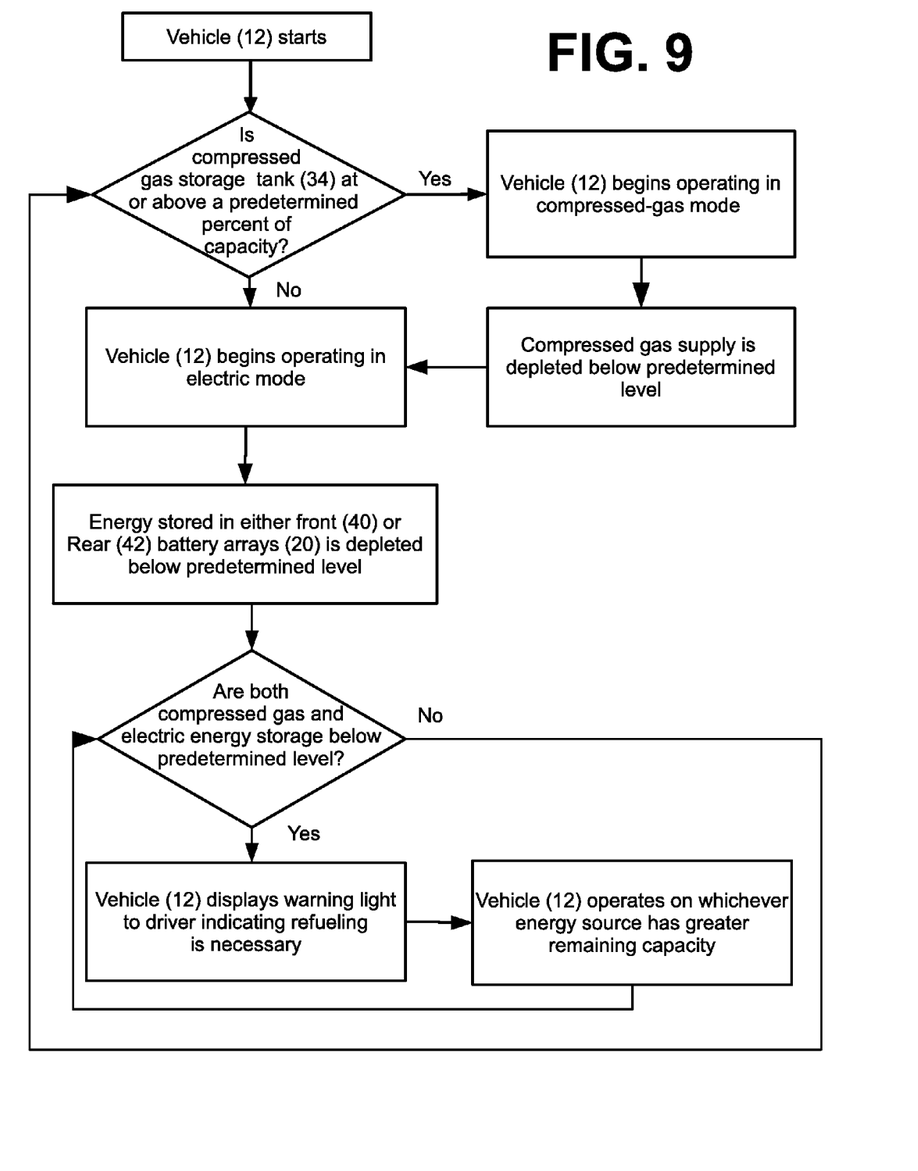
FIG. 9 is a diagrammatic flowchart illustrating the operation of the switching control of the constant recharging air and electric alternating power system of the embodiments of the present invention in switching between the electric and compressed gas power.

Referring now to the figures, in which like numerals indicate like parts, and particularly to FIGS. 1 to 9, which are, respectively, a diagrammatic block diagram of the constant recharging air and electric alternating power system of the embodiments of the present invention for a vehicle, an enlarged diagrammatic block diagram of the area generally enclosed by the dotted shape identified by ARROW 2 in FIG. 1, an enlarged diagrammatic block diagram of the area generally enclosed by the dotted shape identified by ARROW 3 in FIG. 2, an enlarged diagrammatic block diagram of the area generally enclosed by the dotted shape identified by ARROW 4 in FIG. 1, a diagrammatic block diagram illustrating the flow of energy, when using compressed gas to propel the vehicle forward, among the components contained inside the dotted shape identified by ARROW 5 in FIG. 1, a diagrammatic block diagram similar to FIG. 5, except illustrating the constant recharging air and electric alternating power system of the embodiments of the present invention using compressed gas power to propel the vehicle in reverse, a diagrammatic block diagram illustrating the flow of electrical energy among selected components of the constant recharging air and electric alternating power system of the embodiments of the present invention when using electrical energy to propel the vehicle rearward, with the flow being coordinated by a switching control system, a diagrammatic block diagram similar the FIG. 7, except illustrating the constant recharging air and electric alternating power system of the embodiments of the present invention using electrical energy to propel the vehicle forward, and a diagrammatic flowchart illustrating the operation of the switching control of the constant recharging air and electric alternating power system of the embodiments of the present invention in switching between the electric and compressed gas power, the constant recharging air and electric alternating power system of the embodiments of the present invention is shown generally at 10 for a vehicle 12, wherein the vehicle 12 has wheels 14 including independently suspended front wheels 14a and independently suspended rear wheels 14b.

B. Configuration of the Constant Recharging Air and Electric Alternating Power System 10.

The constant recharging air and electric alternating power system 10 comprises an electric mode, a compressed gas mode, a plurality of electric motors/generators 16, a plurality of compressed gas motors 18, battery arrays 20, and transfer switches 22. The plurality of electric motors/generators 16 and the plurality of compressed gas motors 18 are for operatively connecting to the wheels 14 of the vehicle 12. When the constant recharging air and electric alternating power system 10 is in the electric mode thereof, a portion of the plurality of electric motors/generators 16 operate as motors powered by the battery arrays 20 and propel the vehicle 12, while a remaining portion of the plurality of electric motors/generators 16 operate as generators and constantly charge the battery arrays 20. When the constant recharging air and electric alternating power system 10 is in the gas mode thereof, a portion of the plurality of compressed gas motors 18 operate as motors and propel the vehicle 12, while a portion of the plurality of electric motors/generators 16 operate as generators and constantly charge the battery arrays 20. The transfer switches 22 are operatively connected to the plurality of electric motors/generators 16 and the plurality of compressed gas motors 18 and determine automatically—based upon predetermined values—when said constant recharging air and electric alternating power system 10 should operate in the electric mode or in the compressed gas mode.

A pair of electrical motors/generators 16 and a pair of gas motors 18 are for operatively connecting to each wheel 14 of the vehicle 12.

Each pair of electric motors/generators 16 comprise a forwarded operating electric motor/generator 24 and a rearward operating electric motor/generator 26.

Each pair of gas motors 18 comprise a forward operating gas motor 28 and a rearward operating gas motor 30.

The rearward operating motor/generator 26 of each pair of electric motors/generators 16 operate as generators to constantly charge the battery arrays 20 when the forwarded operating electric motor/generator 24 of each pair of electric motors/generators 16 operate as motors driving the vehicle 12 forward and vise versa.

The rearward operating electric motor/generator 26 of each pair of electric motors/generators 16 operate as generators to constantly charge the battery arrays 20 when the forwarded operating compressed gas motor 28 of each pair of compressed gas motors 18 operate as motors driving the vehicle 12 forward and vise versa.

The constant recharging air and electric alternating power system 10 further comprises at least one bi-directional rotary compressor 32.

The at least one bi-directional rotary compressor 32 is for operatively connecting to, so as to be powered by, the wheels 14 of the vehicle 12.

The constant recharging air and electric alternating power system 10 further comprises a compressed gas storage tank 34.

The compressed gas storage tank 34 is in fluid communication with the at least one bi-directional rotary compressor 32, and is constantly filled by the at least one bi-directional rotary compressor 32 until a first predetermined high pressure in the compressed gas storage tank 34 is reached, at which time, said constant recharging air and electric alternating power system switches to the compressed gas mode, until such time as a second predetermined low pressure in the compressed gas storage tank 34 is reached, at which time, said constant recharging air and electric alternating power system switches to the electric mode.

The constant recharging air and electric alternating power system 10 further comprises an external electrical power source 36.

The external electrical power source 36 is in electrical communication with, so as to supplementary charge, the battery arrays 20 when connected thereto.

The constant recharging air and electric alternating power system 10 further comprises an external compressed gas fill source 38.

The external compressed gas fill source 38 is in fluid communication with, so as to supplementary fill, the compressed gas storage tank 34 when connected thereto.

The battery arrays 20 comprise a front battery array 40 and a rear battery array 42.

The front battery array 40 of the battery arrays 20 is in electrical communication with, so as to power and be constantly charged by, the forwarded operating electric motor/generator 24 of each pair of electric motors/generators 16 that are operatively connected to the independently suspended front wheels 14a of the wheels 14 of the vehicle 12 and the rearward operating electric motor/generator 26 of each pair of electric motors/generators 16 that are operatively connected to the independently suspended front wheels 14a of the wheels 14 of the vehicle 12 so as to assure that the front battery array 40 of the battery arrays 20 is constantly being charged regardless of which mode the constant recharging air and electric alternating power system 10 is operating in.

The rear battery array 42 of the battery arrays 20 is in electrical communication with, so as to power and be constantly charged by, the forwarded operating electric motor/generator 24 of each pair of electric motors/generators 16 that are operatively connected to the independently suspended rear wheels 14b of the wheels 14 of the vehicle 12 and the rearward operating electric motor/generator 26 of each pair of electric motors/generators 16 that are operatively connected to the independently suspended rear wheels 14b of the wheels 14 of the vehicle 12 so as to assure that the rear battery array 42 of the battery arrays 20 is constantly being charged regardless of which mode the constant recharging air and electric alternating power system 10 is operating in.

The constant recharging air and electric alternating power system 10 further comprises a first check valve 44.

The first check valve 44 is in fluid communication between the external compressed gas fill source 38 and the compressed gas storage tank 34.

The constant recharging air and electric alternating power system 10 further comprises a second check valve 46.

The second check valve 46 is in fluid communication between the at least one bi-directional rotary compressor 32 and the compressed gas storage tank 34.

The constant recharging air and electric alternating power system 10 further comprises a third check valve 48.

The third check valve 48 is in fluid communication between the compressed gas storage tank 34 and the rearward operating compressed gas motor 30 of each pair of compressed gas motors 18.

The constant recharging air and electric alternating power system 10 further comprises a fourth check valve 50.

The fourth check valve 50 is in fluid communication between the compressed gas storage tank 34 and the forwarded operating compressed gas motor 28 of each pair of compressed gas motors 18.

The constant recharging air and electric alternating power system 10 further comprises a first open/closed valve 52.

The first open/closed valve 52 is in fluid communication between the compressed gas storage tank 34 and the third check valve 48, and is in electrical communication with the transfer switches 22.

The constant recharging air and electric alternating power system 10 further comprises a second open/closed valve 54.

The second open/closed valve 54 is in fluid communication between the compressed gas storage tank 34 and the fourth check valve 50, and is in electrical communication with the transfer switches 22.

The constant recharging air and electric alternating power system 10 further comprises a front emergency clutch 56. The front emergency clutch 56 is for connecting the independently suspended front wheels 14a of the wheels 14 of the vehicle 12 together so as to go from a live front axle to a dead front axle.

The constant recharging air and electric alternating power system 10 further comprises a rear emergency clutch 58. The rear emergency clutch 58 is for connecting the independently suspended rear wheels 14b of the wheels 14 of the vehicle 12 together so as to go from a live rear axle to a dead rear axle.

C. Impressions.

It will be understood that each of the elements described above or two or more together may also find a useful application in other types of constructions differing from the types described above.

While the embodiments of the present invention have been illustrated and described as embodied in a constant recharging air and electric alternating vehicle power system, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A constant recharging air and electric alternating power system for a vehicle, wherein the vehicle has wheels including independently suspended front wheels and independently suspended rear wheels, said constant recharging air and electric alternating power system comprising:
   a) an electric mode;
   b) a compressed gas mode;
   c) a plurality of electric motors/generators;
   d) a plurality of compressed gas motors;
   e) battery arrays; and
   f) transfer switches;

wherein said plurality of electric motors/generators and said plurality of compressed gas motors are for operatively connecting to the wheels of the vehicle;

wherein when said constant recharging air and electric alternating power system is in said electric mode thereof, a portion of said plurality of electric motors/generators operate as motors powered by said battery arrays and propel the vehicle, while a remaining portion of said plurality of electric motors/generators operate as generators and constantly charge said battery arrays;

wherein when said constant recharging air and electric alternating power system is in said gas mode thereof, a portion of said plurality of compressed gas motors operate as motors and propel the vehicle, while a portion of said plurality of electric motors/generators operate as generators and constantly charge said battery arrays; and wherein said transfer switches determine automatically—based upon predetermined values—when said constant recharging air and electric alternating power system should operate in said electric mode or in said compressed gas mode.

2. The constant recharging air and electric alternating power system of claim 1, wherein a pair of electrical motors/generators and a pair of compressed gas motors are for operatively connecting to each wheel of the vehicle.

3. The constant recharging air and electric alternating power system of claim 2, wherein each pair of electric motors/generators comprise:
 a) a forwarded operating electric motor/generator; and
 b) a rearward operating electric motor/generator.

4. The constant recharging air and electric alternating power system of claim 3, wherein each pair of compressed gas motors comprise:
 a) a forward operating compressed gas motor; and
 b) a rearward operating compressed gas motor.

5. The constant recharging air and electric alternating power system of claim 4, wherein said rearward operating electric motor/generator of each pair of electric motors/generators operate as generators to constantly charge said battery arrays when said forward operating compressed gas motor of each pair of compressed gas motors operate as motors driving the vehicle forward and visa versa.

6. The constant recharging air and electric alternating power system of claim 4, further comprising at least one bi-directional rotary compressor; and
 wherein said at least one bi-directional rotary compressor is for operatively connecting to, so as to be powered by, the wheels of the vehicle.

7. The constant recharging air and electric alternating power system of claim 6, further comprising a compressed gas storage tank.

8. The constant recharging air and electric alternating power system of claim 7, wherein said compressed gas storage tank is in fluid communication with said at least one bi-directional rotary compressor.

9. The constant recharging air and electric alternating power system of claim 7, wherein said compressed gas storage tank is constantly filled by said at least one bi-directional rotary compressor until a first predetermined high pressure in said compressed gas storage tank is reached, at which time, said constant recharging air and electric alternating power system switches to said compressed gas mode thereof, until such time as a second predetermined low pressure in said compressed gas storage tank is reached, at which time, said constant recharging air and electric alternating power system switches to said electric mode thereof.

10. The constant recharging air and electric alternating power system of claim 7, further comprising an external compressed gas fill source.

11. The constant recharging air and electric alternating power system of claim 10, wherein said external compressed gas fill source is in fluid communication with said compressed gas storage tank when connected thereto; and
 wherein said external compressed gas fill source supplementary fills said compressed gas storage tank.

12. The constant recharging air and electric alternating power system of claim 10, further comprising a first check valve.

13. The constant recharging air and electric alternating power system of claim 12, wherein said first check valve is in fluid communication between said external compressed gas fill source and said compressed gas storage tank.

14. The constant recharging air and electric alternating power system of claim 7, further comprising a second check valve.

15. The constant recharging air and electric alternating power system of claim 14, wherein said second check valve is in fluid communication between said at least one bi-directional rotary compressor and said compressed gas storage tank.

16. The constant recharging air and electric alternating power system of claim 7, further comprising a third check valve.

17. The constant recharging air and electric alternating power system of claim 16, wherein said third check valve is in fluid communication between said compressed gas storage tank and said rearward operating compressed gas motor of each pair of compressed gas motors.

18. The constant recharging air and electric alternating power system of claim 16, further comprising a first open/closed valve.

19. The constant recharging air and electric alternating power system of claim 18, wherein said first open/closed valve is in fluid communication between said compressed gas storage tank and said third check valve.

20. The constant recharging air and electric alternating power system of claim 7, further comprising a fourth check valve.

21. The constant recharging air and electric alternating power system of claim 20, wherein said fourth check valve is in fluid communication between said compressed gas storage tank and said forwarded operating compressed gas motor of each pair of compressed gas motors.

22. The constant recharging air and electric alternating power system of claim 20, further comprising a second open/closed valve.

23. The constant recharging air and electric alternating power system of claim 22, wherein said second open/closed valve is in fluid communication between said compressed gas storage tank and said fourth check valve.

24. The constant recharging air and electric alternating power system of claim 4, wherein said battery arrays comprise:
 a) a front battery array; and
 b) a rear battery array.

25. The constant recharging air and electric alternating power system of claim 24, wherein said front battery array of said battery arrays is in electrical communication with, so as to power and be constantly charged by, said forwarded operating electric motor/generator of each pair of electric motors/generators that are operatively connected to the independently suspended front wheels of the wheels of the vehicle and said rearward operating electric motor/generator of each pair of electric motors/generators that are operatively connected to the independently suspended front wheels of the wheels of the vehicle so as to assure that said front battery array of said battery arrays is constantly being charged regardless of which mode said constant recharging air and electric alternating power system is operating in.

26. The constant recharging air and electric alternating power system of claim 24, wherein said rear battery array of said battery arrays is in electrical communication with, so as to power and be constantly charged by, said forwarded operating electric motor/generator of each pair of electric motors/generators that are operatively connected to the independently suspended rear wheels of the wheels of the vehicle and said rearward operating electric motor/generator of each pair of electric motors/generators that are operatively connected to the independently suspended rear wheels of the wheels of the vehicle so as to assure that said rear battery array of said battery arrays is constantly being charged regardless of which mode said constant recharging air and electric alternating power system is operating in.

27. The constant recharging air and electric alternating power system of claim 3, wherein said rearward operating electric motor/generator of each pair of electric motors/generators operate as generators to constantly charge said battery arrays when said forwarded operating electric motor/generator of each pair of electric motors/generators operate as a motor driving the vehicle forward and visa versa.

28. The constant recharging air and electric alternating power system of claim 1, further comprising an external electrical power source.

29. The constant recharging air and electric alternating power system of claim 28, wherein said external electrical power source is in electrical communication with said battery arrays when connected thereto; and
   wherein said external electrical power source supplementary charges said battery arrays.

30. The constant recharging air and electric alternating power system of claim 1, further comprising a front emergency clutch; and
   wherein said front emergency clutch is for connecting the independently suspended front wheels of the wheels of the vehicle together so as to go from a live front axle to a dead front axle.

31. The constant recharging air and electric alternating power system of claim 1, further comprising a rear emergency clutch; and
   wherein said rear emergency clutch is for connecting the independently suspended rear wheels of the wheels of the vehicle together so as to go from a live rear axle to a dead rear axle.

\* \* \* \* \*